Patented Sept. 26, 1950

2,523,442

UNITED STATES PATENT OFFICE 2,523,442

RECOVERY OF LABILE BIOLOGICAL MATERIALS

Graham W. McMillan and Frank J. Rudert, Terre Haute, Ind., assignors to Commercial Solvents Corporation, Terre Haute, Ind., a corporation of Maryland No Drawing. Application July 16, 1945, Serial No. 605,442

3 Claims. (Cl. 260—302)

This invention relates to a method for minimizing the destruction of metal sensitive labile biological materials during their recovery, purification and storage. More particularly it relates to a method for inhibiting or suppressing the destructive or inactivating effects of iron, copper, zinc, lead, nickel, cobalt and the like, present in, or in contact with solutions of said labile biological materials, by the addition thereto of a soluble material containing an ortho- or pyrophosphate radical.

In the synthesis of chemicals by biological fermentations, many of the chemicals thus produced are extremely sensitive to the presence of iron, copper, zinc, lead, nickel, cobalt, etc., and in many cases are destroyed or inactivated by exposure to these metals, especially iron, when the latter are present in quantities in excess of very minute amounts.

For example, in the preparation of penicillin by the propagation of such molds as *Penicillium notatum*, *Penicillium chrysogenum* and the like, the aqueous culture liquors containing dissolved penicillin are subjected to a series of steps to purify and concentrate the active penicillin material and during these steps the solutions may be subjected to conditions which cause them to pick up dissolved iron or other destructive metals, and to other conditions, such as concentration steps, storage in metal equipment and the like which increase the percentage concentration of the iron, etc., already present. During these storage and recovery steps the intimate contact of free iron, etc., in solution in the concentrations obtaining, causes an inactivation or destruction of part or all of the penicillin material present, resulting in a partial or complete loss of the valuable penicillin material.

We have now found, that the destructive effect of iron, copper, zinc, lead, nickel and cobalt on penicillin and similar metal sensitive biological materials in aqueous solutions can be substantially completely inhibited or suppressed by adding to the aqueous solution thereof a material containing a phosphate radical either as ortho-phosphate or pyrophosphate, and maintaining the phosphate material in contact with the penicillin solution until penicillin material is either transferred from aqueous solution to an organic solvent solution, or is so contained as an aqueous solution, that substantially no further addition of iron is to be expected.

Our invention will be described using penicillin as the illustrative metal-sensitive biological material, but it should be clearly understood that other metal-sensitive biological materials may be similarly treated with equally effective results.

In one commonly practiced method of recovering penicillin material from its culture liquors, the filtered broth is treated with active carbon to adsorb the penicillin and the adsorbate is then eluted with an aqueous solution of a low-boiling water-miscible organic liquid, for example, acetone. This aqueous, organic liquid solution of penicillin is then evaporated at moderate temperatures to volatilize the organic solvent, and leave the penicillin in the remaining aqueous solution in concentrated form. In this operation, not only is the penicillin material concentrated, but likewise the impurities, including iron and other penicillin destroying metals such as copper, lead, zinc, nickel and cobalt are correspondingly concentrated. Thus, while in the culture liquor as produced, the concentration of free iron and other destructive metals is below the critical destructive limit of about 5 parts per million, and while the eluate solution is also usually below this critical figure, it reaches a concentration above the danger point considerably before the organic solvent is completely volatilized, both by the acquisition of additional iron from the equipment, if iron equipment is used, and in any case by the concentrating effect of evaporation of the organic liquid.

Thus it has been necessary in the past to avoid wherever possible, any treatments or steps which would tend to add iron to the solution, and hence it has been necessary to avoid iron, brass or other destructive metal equipment in the storage, processing and evaporation of these solutions. When proceeding in accordance with out invention, however, it is no longer necessary to observe these drastic precautions, as the treatment according to our invention not only protects the penicillin activity of the solution against destruction by these metals during the recovery steps, and makes possible the utilization of iron or other destructive metal processing equipment and likewise permits storage of the aqueous penicillin material in iron or other metallic equipment, either before or after recovery and purification of the solution.

Table I below illustrates the destructive effect on penicillin solutions of the metals iron, copper and zinc when the penicillin solutions are stored in contact with these metals. Steel, copper, brass, and zinc strips respectively were used and the results are given in terms of the lessening of the half life of the penicillin activity under such conditions. All the tests listed below were made with aliquots of the same original solution which contained an initial, small quantity of dissolved iron of about 4 parts per million.

TABLE I

| No. | Temp., °C | pH | Metal Strip | Per Cent Residual Penicillin | | | ½-Life, hrs. |
|---|---|---|---|---|---|---|---|
| | | | | 10 hrs. | 20 hrs. | 30 hrs. | |
| 1 | 30 | 8.0 | None | 92 | 80.5 | 75 | >>100 |
| 2 | 30 | 8.0 | Steel | 85 | 71 | 61 | 44 |
| 3 | 30 | 8.0 | Copper | 83 | 75 | 70 | 90 |
| 4 | 30 | 8.0 | Brass | 91 | 78 | 66.5 | 48 |
| 5 | 30 | 8 | Zinc | 83 | 65 | 55 | 50 |

The destructive action of iron, etc., on penicillin solutions takes place at virtually all the pH values within the range within which penicillin may be handled, and the destructive effect is more pronounced at low pH values as illustrated in the following table in which the area of steel surface in contact with penicillin containing aqueous-acetone solution (75% acetone) was in the proportion of 0.03 square centimeter of steel surface per cubic centimeter of aqueous acetone eluate solution. The use of phosphate material in connection with penicillin solutions at any of these pH values is effective in suppressing iron activity.

TABLE II

| No. | Temp., °C | pH | Metal Strip | Per Cent Residual Penicillin | | | | | ½-Life, hrs. |
|---|---|---|---|---|---|---|---|---|---|
| | | | | 5 hrs. | 10 hrs. | 15 hrs. | 20 hrs. | 40 hrs. | |
| 1 | 30 | 8.5 | Steel | 85 | 68 | 63 | 60 | 46 | 35 |
| 2 | 30 | 7.6 | do | 63 | 46 | 32 | 20 | ca. 1 | 8.5 |
| 3 | 30 | 6.3 | do | 22 | 10 | 3 | 0 | 0 | 2.5 |
| 4 | 30 | 5.5 | do | 8 | 0 | 0 | 0 | 0 | 0.75 |

The adverse effect of evaporating penicillin-containing aqueous acetone eluate solutions in the presence of iron in the form of steel surfaces is illustrated in the table below, wherein the steel surface was in the proportion of 0.03 square centimeter of steel surface per cubic centimeter of aqueous acetone eluate solution and wherein the evaporation was carried out under reduced pressure at 20–30° C. until the pressure fell to about 20 to 30 mm.

TABLE III

*Evaporation of eluate in presence of iron*

| No. | pH | Steel | Temp., °C | Initial | | After 1.5 Hours | | | After 4.0 Hours | | | Color |
|---|---|---|---|---|---|---|---|---|---|---|---|---|
| | | | | Vol. (ml.) | Units (O.U.) | Vol. (ml.) | Units (O.U.) | Percent Res. Pen. | Vol.[1] (ml.) | Units (O.U.) | Percent Res. Pen. | |
| 1 | 7.0 | None | 20–30 | 400 | 98,000 | 298 | 112,000 | 114 | 240 | 117,500 | 120 | Light-red. |
| 2 | 7.0 | Yes | 20–30 | 400 | 98,000 | 289 | 97,500 | 99.5 | 210 | 56,700 | 58 | Black. |

[1] 100 ml of acetone was added to A and to B after the data was obtained at 1.5 hours.

In carrying out our invention we treat the aqueous penicillin solution containing an excess of destructive heavy metal such as iron, copper, zinc, etc., or likely to be subjected to conditions in which iron may be acquired, with a small quantity of a dissolved water-soluble ionizable phosphate which is inert toward penicillin and selected from a class consisting or orthophosphates ($PO_4$) and pyrophosphates ($P_2O_7$), for example tetra sodium- or potassium pyrophosphate, trisodium acid pyrophosphate, trisodium phosphate, dipotassium hydrogen phosphate, sodium dihydrogen phosphate, as well as ionizable organic phosphates and the like. Very small quantities of these materials are sufficient to substantially completely inhibit penicillin destruction even when relatively large quantities of dissolved destructive metals are present. For example, quantities of phosphate material of about 1 gram per liter will successfully inhibit quantities of dissolved iron up to at least 10 parts per million.

Lesser concentrations of destructive metals may be inhibited by somewhat lesser quantities of phosphate material, although from the point of view of providing adequate safety factors, a minimum quantity of about 0.5 gram of phosphate material per liter of solution is desirable. If greater concentrations of destructive metals are present, proportionally greater quantities of phosphate material are used.

In the case of the penicillin recovery process, a particularly vulnerable stage, from the point of view of destruction of penicillin activity due to the presence of iron and similar metals, occurs at the point where the penicillin material has been eluted from the active carbon adsorbate with an aqueous, water-miscible organic solvent. As eluted, this solution usually contains about 2 to 5 parts per million of iron, a quantity low enough to cause little, if any destruction of penicillin activity under the conditions of the recovery. But as brought out above, greater quantities—above this critical range—cause serious destruction of penicillin activity. Accordingly as the organic solvent is evaporated to concentrate the penicillin material in the aqueous portion of the solution, there is a corresponding proportionate concentration effect on the iron present. Moreover, if the evaporation is carried out in iron, brass or steel equipment, still more of the destructive metal is added to the solution.

Accordingly, in applying our process to the recovery of penicillin liquors, we prefer to add the phosphate material to the eluate solution after elution of the adsorbate, and before further treatment or concentration of the eluate solution. For this purpose quantities as low as 0.5 to 1 gram of phosphate material per liter furnish substantially complete inhibition of iron, etc., destruction in the penicillin solutions during evaporation, even when such evaporations are carried out in iron or brass equipment.

After evaporation of the eluate, a commonly employed practice is to extract this water solution of penicillin with a water-immiscible solvent such as amyl acetate in which both the excess phosphate used and the iron compounds—either initially in solution or formed by the added phosphates—are insoluble, and are effectively removed from solution.

EXAMPLE I

As illustrative of the stabilization of penicillin by phosphates against destruction by free soluble iron during atmospheric pressure evaporation of aqueous acetone eluate solutions, varying quantities of iron were deliberately added to acetone eluate solutions containing initially between 3 and 5 parts per million iron prepared about 60 to 80° C., and the percent recovery of penicillin noted, with the results given below.

Table.—*Stabilization of eluate during evaporation in presence of dissolved iron*

| Amount of Added $Fe^{++}$ | Stabilizing Phosphate | | Avg. Penicillin Recovery |
|---|---|---|---|
| | Type | Amount | |
| P. P. M. | | G./l. | Per Cent |
| 2½ | $Na_4P_2O_7$ | 0.25 | 88 |
| 2½ | ---do--- | 0.5-1.0 | 102 |
| 5 | ---do--- | 0.25 | 81 |
| 5 | ---do--- | 0.5-1.0 | 101.5 |
| 10 | ---do--- | 0.2-0.3 | 70 |
| 10 | ---do--- | 0.5-1.0 | 102 |
| 5 | $K_2HPO_4$ | 0.15 | 88 |
| 5 | ---do--- | 0.3 | 105 |
| 5 | $Na_3PO_4$ | 0.1 | 78 |
| 5 | ---do--- | 0.2-0.3 | 103 |
| 5 | $Na_2HPO_4$ | 0.1 | 80 |
| 5 | ---do--- | 0.2-0.4 | 94.5 |
| None | None | None | 96 |
| 2½ | ---do--- | None | 63 |
| 5 | ---do--- | None | 43 |
| 10 | ---do--- | None | 15 |
| 20 | ---do--- | None | 5 |

EXAMPLE II

In this example steel strips were immersed in aqueous acetone eluate solutions of penicillin containing 75% acetone, and which initially contained about 3 parts per million of dissolved iron. Others contained no strips. The immersed strip areas were in the proportion of 0.03 square centimeter of steel surface per cubic centimeter of aqueous acetone eluate solution. To some of the solutions was added tetrasodium pyrophosphate in the quantities indicated, and other solutions were left free of added pyrophosphate. All the solutions were allowed to stand at 30° C. for the periods indicated with the results indicated in the table below.

EXAMPLE IV

The stabilizing effect of phosphates on penicillin solutions in contact with zinc surfaces is illustrated in the table below wherein penicillin-containing aqueous-acetone eluate solutions and aqueous evaporated eluate solutions were stored for the periods indicated in contact with strips of zinc metal, for the periods indicated, some with no added phosphate, others with the addition of the indicated quantities of an organic phosphate sold commercially by Monsanto Chemical Company as a denatured ethanol solution of dibutylamine pyrophosphate.

*Table.—Stabilization by phosphates of solutions in contact with zinc*

| Soln. | Amt. of Zn Surface ($cm.^2/cm.^3$) | Amt. of DP Soln. 4519 (ml./100 ml.) | Per Cent Residual Penicillin | | | | ½ Life, Hours |
|---|---|---|---|---|---|---|---|
| | | | 4 hrs. | 20 hrs. | 68 hrs. | 92 hrs. | |
| Evap.[1] | 0 | 0 | 100 | 98 | 73 | 68 | >100 |
| Do | 0.0014 | 0 | 95 | 84 | 29 | 10 | 50 |
| Do | 0.0028 | 0 | 100 | 65 | 16 | 2 | 35 |
| Do | 0.0028 | 0.2 | 93 | 87 | 92 | 72 | >100 |
| Do | 0.0028 | 0.4 | 100 | 99 | 89 | 72 | >100 |
| Eluate[2] | 0 | 0 | 100 | 85 | 96 | 84 | >100 |
| Do | 0.0014 | 0 | 102 | 84 | 15 | 4 | 42 |
| Do | 0.0028 | 0 | 103 | 73 | 0 | 0 | 35 |
| Do | 0.0028 | 0.2 | 107 | 96 | 100 | 76 | >100 |
| Do | 0.0028 | 0.4 | 103 | 89 | 87 | 71 | >100 |

[1] Eluate pH=8.0.
[2] Evaporate pH=7.6.

While the above describes the preferred embodiments of our invention, it will be understood that departures may be made therefrom within the scope of the specification and claims.

What is claimed is:

1. In the manufacture of penicillin wherein an aqueous penicillin-containing liquor is evaporated in contact with heavy metals tending to reduce the penicillin activity thereof, the improvement which comprises conducting the evaporation of said liquor in the presence of from about 0.5 to 10 grams per liter of a dissolved water-soluble ionizable phosphate which is inert toward penicillin and selected from a class consisting of orthophosphates and pyrophosphates.

2. The process of claim 1 wherein said phosphate is an alkali metal phosphate.

3. The process of claim 2 wherein the alkali metal phosphate is tetrasodium pyrophosphate.

GRAHAM W. McMILLAN.
FRANK J. RUDERT.

REFERENCES CITED

The following references are of record in the file of this patent:

UNITED STATES PATENTS

| Number | Name | Date |
|---|---|---|
| 2,438,106 | Auburn et al. | Mar. 23, 1948 |

OTHER REFERENCES

Coghill Report, No. 12, May 3, 1943.
Foster: J. Bacteriology, October 1943, p. 386.
Committee of Medical Research "Coghill Reports," No. 17, January 17, 1944.
Penn State Interim Report, 44–80, Sept. 1, 1944.
Penn State Report, 41–101, Oct. 20, 1944.